United States Patent [19]
Yamada et al.

[11] Patent Number: 5,360,290
[45] Date of Patent: Nov. 1, 1994

[54] UNDERGROUND DRAINAGE FACILITY, VERTICAL-SHAFT MULTI-STAGE ADJUSTABLE VANE PUMP, AND METHOD OF RUNNING DRAINAGE PUMP

[75] Inventors: Masayuki Yamada, Tsuchiura; Saburo Maru; Sumio Sudo, both of Ibaraki, all of Japan

[73] Assignee: Hitachi, Ltd., Tokyo, Japan

[21] Appl. No.: 988,755

[22] Filed: Dec. 10, 1992

[30] Foreign Application Priority Data

Dec. 13, 1991 [JP] Japan .................................. 3-330301
Apr. 24, 1992 [JP] Japan .................................. 4-106673

[51] Int. Cl.$^5$ .......................... E02F 1/00; E02B 11/00
[52] U.S. Cl. .................................. 405/52; 137/236.1; 210/170; 405/37; 405/80
[58] Field of Search ............... 405/36, 52, 43, 37, 405/80, 53; 210/170; 137/236.1

[56] References Cited

U.S. PATENT DOCUMENTS

| | | | |
|---|---|---|---|
| 3,626,823 | 2/1970 | Toth | 405/36 X |
| 3,919,848 | 11/1975 | Sullivan | 405/43 |
| 4,457,646 | 7/1984 | Laesch | 405/52 |
| 4,890,955 | 1/1990 | Mercier | 405/36 X |
| 4,997,312 | 3/1991 | Regan | 405/36 X |

*Primary Examiner*—Dennis L. Taylor
*Attorney, Agent, or Firm*—Antonelli, Terry, Stout & Kraus

[57] ABSTRACT

An underground drainage facility including a drainage pump adapted to be operated if an inflow water channel is constructed as a closed channel. Overflow weirs in water channels such as rivers or the like on an inflow side are less than a maximum water level. A vertical-shaft multi-stage adjustable-vane impeller is used as a drainage pump. Consequently, even a drainage pump of a high pressure head and large capacity can perform a waiting running and accommodate a variation in a quantity of inflowing water to the drainage facility.

19 Claims, 11 Drawing Sheets

UNDERGROUND DRAINAGE FACILITY, VERTICAL-SHAFT MULTI-STAGE ADJUSTABLE VANE PUMP, AND METHOD OF RUNNING DRAINAGE PUMP

BACKGROUND OF THE INVENTION

The present invention relates to an underground drainage facility arranged such that influent fluids such as rainwater or the like flowing into water channels including small rivers is collected in an inflow channel and, more particularly, to a large capacity underground floodway with a slightly inclined inflow water channel which is provided in an underground location, with the floodway having a large depth of between 15 to 60 m, wherein the collected influent is lead to a drain pumping station, so as to be discharged into a river and the like where the influent is discharged and, with the underground drainage facility being suitable for reducing power consumption of drainage pumps, reducing volume or capacity of a pump well or time lag or delay in the following-up of flowing-down of the upstream influent at the start of the drainage pumps, and/or for measuring an upsurge at a suspension of operation of the pump. Recently, large underground drainage facilities have been proposed, wherein an inflow water channel having a large cross-sectional area is disposed at the deep location under the ground for a long distance. Underground facilities having a large depth in a solid or strong ground of a deep layer do not effect or influence an upper structure, and generally a depth equal to or greater than 50 m from the surface level is provided.

Conventionally, open channel flow operation drainage systems, wherein water flows down at a water level having a free surface in a conduit have been utilized, because inflowing water channels are not too deep and have a small distance, as compared with large underground drainage facilities of the type described hereinabove. However, closed channel flow operation wherein water flows down at a water level, in which the water fills the entire conduit have been proposed and the mixed flow operation of open channel and closed channels has also been considered. Either of these proposals however have a storage or reservoir tank for causing the same to have storage capabilities. If drainage pumps are installed in the open channel flow operation, pumps having a large capacity and pressure head are required, and the capacity of prime movers also increases. Furthermore, a valve on the discharge or delivery side is also required which has a large bore diameter and a high pressure, and a prime mover for opening and closing the valve also increases in size. If a large underground drainage facility is built in a conventional manner, in a relatively small underground drainage facility, not only do the constructional costs increase, but also there is an increase in the operating expenses. Thus, the conventional, relatively small underground drainage facility is uneconomical.

Moreover, it is necessary to provide a storage tank and to increase the capacity of the pump well because the storage advantages are reduced in the mixed flow operation of open channel and closed channel. This likewise increases construction cost.

Further, since the inflow water channel is lengthened considerably, water on the upstream side cannot be moved immediately following an operation of drainage pumps, even if the drainage pumps are operated. In a method in which drainage pumps are operated only in response to a level in a conventional pump well, there is a problem of delay or time lag in following flowing-down, which leads to an overflow of rivers or the like on the upstream side.

On the other hand, in the underground drainage facility, in order for a drainage of an estimated amount of water to be effected due to an abrupt increase in a quantity of inflow due to a rainfall a so-called waiting running is required in which running of drainage pumps starts before the influent reaches the pump well, that is, from a condition where a water level within the pump well is low. In a case of such waiting running, it is desired that a quantity of discharge of the drainage pumps is adjusted or regulated easily and economically in accordance with a change in a quantity of inflow. In order to satisfy such demand, a vertical-shaft adjustable vane pump in, for example, Japanese Patent Unexamined Application 57-1286092, is proposed in which a vane or blade angle of a pump impeller is variable.

Conventionally, a vertical-shaft adjustable-vane pump is used as a circulating pump, which circulating pump has a relatively low pressure head of, for example, equal to or less than about 30 m. However, a conventional vertical-shaft adjustable-vane pump is not used as a drainage pump which has a high pressure head such that the total pressure head reaches 50 to 60 m and which has a large capacity, for the following reasons.

When the total pressure head increases or becomes high, a fluid force applied to the adjustable vanes increases correspondingly. Accordingly, a load applied to a blade-angle operating mechanism which regulates a blade or vane angle of the impeller increases, so that the vane-angle operating mechanism increases in size. On the other hand, since there is a limitation in dimensioning, the blade-angle operating mechanism must be received in a limited space within a hub of the impeller, there is also a limit in an allowable load of the vane-angle operating mechanism. Accordingly, an adjustable vane pump cannot be applied to a drainage pump which is high in total head and which is large in capacity, as it is.

When a total pressure head increases, a specific speed Ns expressed by the following equation must be reduced to a value less than the conventional one. Accordingly, there is a problem that efficiency and suction performance are reduced. Specifically, in the following equation, the rotational speed N is determined by suction pressure of the pump and a cavitation condition, and a discharge Q and a pressure head H are given from the drainage plan. Accordingly, if the pressure head H increases, the specific speed Ns must necessarily be reduced to a low value.

$$N = \frac{\sqrt{Q}}{H^{\frac{3}{4}}} \quad (1)$$

However, generally an adjustable impeller vane is arranged such that a shaft thereof is rotatably supported by a hub supported by a drive shaft, and is rotated about the axis of the shaft to adjust the vane angle. Accordingly, a tip surface on the side of a casing of the impeller and a hub surface on the side of a drive shaft must be formed respectively into concentric spherical surfaces to conform to an inner surface of the casing and an outer surface of the hub. In view of such restriction on shape, there is a problem that, if the specific speed is low, the efficiency and the suction performance are degraded.

SUMMARY OF THE INVENTION

It is an object of the invention to solve the above-discussed problems of the prior art, and it is a first object of the invention to provide an underground drainage facility and a method of running drainage pumps, in which it is possible to save running cost by reduction in power of the drainage pumps, and to reduce construction or building cost.

Another object of the invention is to provide an underground drainage facility of high reliability, in which, even if follow-up delay or time lag of influent flow on the upstream side, upsurge at the time of suspension of drainage pumps, or the like occurs, rivers and the like on the upstream side do not overflow.

Yet a further object of the invention is to provide an adjustable vane pump which is suitable for use in high pressure head and large capacity.

In accordance with the present invention, an underground drainage facility according to the a drainage pump constructed such that an inflow water channel is not an open channel, but an estimated quantity of water is discharged after the inflow water channel has been brought to a closed channel, and discharge operation even in the case of open channel.

Further, the underground drainage facility is characterized in that an adjustable vane pump or a rotational speed control pump is used as a drainage pumps and delay in drainage is made possible.

Furthermore, the underground drainage facility is characterized in that, as another means, the drainage pump comprises pumps of small capacity and high pressure head and pumps of large capacity and low pressure head arranged respectively at locations where an estimated quantity of water is discharged in the case of an open channel and a closed channel and the pumps of high pressure head and small capacity run in drainage waiting.

An underground drainage facility according to the invention is characterized in that a height of an overflow weir such as rivers, closed conduits, drainage channels or the like on the inflow side is so determined as to be lower than the maximum water level, thus causing water to be introduced into the underground inflow water channel.

Furthermore, the underground drainage facility of the present invention is characterized in that, the further upstream the pump, the larger the size of, for example, a diameter of inflow vertical shaft with respect to a quantity of inflow.

According to the present invention an adjustable vane pump is provided which comprises a vertical-shaft multi-stage adjustable-vane pump in which a plurality of vertical-shaft pumps are connected to each other on the same axis in a multi-stage manner, and the vertical-shaft pump of at least one stage comprises adjustable impeller vanes so supported to make a vane angle variable with respect to a drive shaft, and a vane-angle operating mechanism for rotating the adjustable impeller vanes about a support shaft to adjust the vane angle.

With the above arrangement, according to the

Since the construction of the drainage pump is determined so as to be capable of draining an estimated quantity of water in the case of a closed channel, not in the case of an open channel, the total pressure head of the pump is reduced small, and the power for draining the same quantity of water is reduced. In this case, since operation with a closed channel system is small in buffer advantage as compared with an open channel, water can overflow if water level in the pump well rises quickly and the elapsed time until a start of the pump is increased.

Such situation can be met with by a pump with adjustable vanes, and operating the pump may be constructed in such a manner that the pump starts at a fully closed position of the vane angle (the minimum vane angle) when water within the pump well does not rise or the water starts to rise, and as water level of the pump well, the vane angle is opened to maintain the water level of the pump well constant. Furthermore, the use of an adjustable vane pump makes it possible to bring the initial quantity of discharge water to a small quantity. If a weir is provided on the discharge side, a discharge valve can be eliminated.

Moreover, floodwater on the upstream side can be prevented by providing a start timing of the adjustable vane pump dependent upon not only a water level in the pump well, but also a water level in the inflow vertical shaft on the upstream side. The pump is operated with the vane angle fully closed just before stoppage of the pump so that it is possible to reduce an upsurge at stoppage.

This is also possible if a rotational-speed control pump is used. It suffices that the pump start at low speed rotation, and the rotational speed rise as water level within the pump well rises.

Moreover, in place of the use of an adjustable vane pump, it is also possible to install pumps which comprise pumps of a small capacity and a high pressure head and pumps of a large capacity and a low head. That is, this is made possible by running pumps of a small capacity and a high pressure head over a period of time from the delayed running at fully closed vane angle to drainage of a small quantity of water and running pumps of a large capacity and a low pressure head during drainage running after the rise in water level in the pump well. Of course, it is also possible to increase the capacity and the pressure head of the pumps in a three stages and four stages manner on the basis of the plan of an underground drainage facility. Next, if overflow weirs are provided on rivers, covered conduits or flood control channels on the inflow side, and are lower in height than the maximum water levels in rivers, covered conduits or floor control channels so as to compensate for a quantity of water corresponding to upsurge at stop of pump, it is possible to make water levels in rivers, covered conduits or flood control channels on the inflow side lower than the maximum water level, even if the upsurge occurs at stopping of the pump.

Further, it can take several tens of minutes until water in the inflow water channels immediately below each overflow weirs starts to move after running of the pump, in the case where the inflow water channels extend over long distances. In order to cope with this, the heights of the weirs are lowered below the maximum water levels to compensate for quantities of water corresponding to the quantity of inflow during this, whereby it is possible that water within the inflow water channels starts to move while water levels therein are lower than the maximum water levels.

Furthermore, this is made possible by relatively enlarging inflow vertical shafts in relation to quantities of inflow as it goes toward the upstream side since follow-up characteristics of water become more degraded as it goes toward the upstream side.

On the other hand, since the adjustable vane pump according to the invention is a vertical-shaft multi-stage adjustable-vane pump which comprises a plurality of vertical-shaft pump stages connected to each other on the same axis in a multi-stage manner, and in which a vertical-shaft impeller of at least one stage is composed of adjustable impeller vanes, the pressure head born by the adjustable vane impeller stage is less than the total pressure head of the entire pump. Accordingly, it is possible reduce a load applied to the adjustable-vane operating mechanism, so that the operating mechanism is reduced in size, and can be received within the impeller hub. Furthermore, since the specific speed is not required to be reduced, it is possible to maintain pump efficiency and suction performance favorable. As a result, it is possible to realize an adjustable vane pump suited for the use involving a high head and a large capacity, that is, suitable for a drainage pump for a high-depth underground drainage facility. Thus, it is possible to easily and economically adjust a discharge of the drainage pump to waiting running or a change in the quantity of inflow.

Moreover, if all of the stages are constituted by adjustable vane pumps, regulation of the discharge is further facilitated.

In the case where a plurality of stages are constituted by adjustable vane pumps, a vane-angle operating mechanism is preferably constructed such that a drive shaft of each adjustable vane pump is formed to be hollow, an operating shaft is inserted into a hollow portion, the operating shaft and adjustable impeller vanes are connected to each other by a link mechanism, and an axial movement of the operating shaft is converted into a vane-angle rotational motion of the adjustable vanes by the like mechanism. With the arrangement, since the vane angle of the impeller of each stage can be regulated in interlocking manner by a single operating shaft, the arrangement can be simplified.

In the case where a part of the stages are constituted by adjustable vane impellers, it is preferable that pumps on the upper stage side includes adjustable vane impellers. If done the other way around, the suction pressure of the fixed vane pump in the upper stage is reduced to threaten cavitation when the vane angles of the impellers on the lower stage side are fully or nearly closed.

For the similar reasons, in the case where adjustable vane pumps constitute two stages or more, the vane-angle operating mechanism is preferably set such that vane angles on the lower stage side come to angular positions slightly larger than the minimum vane angle (closure) when vane angles on the upper stage side are brought to the minimum vane angle (closure). Further, it is possible to improve PNSH performance during running at large flow rates as compared with the case where vane angles of the upper and lower stages are set to the same values, while it is possible to shift flow rates of each impeller at the start of backflow and at inflection points of a pressure head curve during running of low or small flow rates. Thus, there can be provided pumps of stable head curves.

Furthermore, an arrangement is preferable in which a casing, a drive shaft and a vane-angle operating shaft of a multi-stage vertical-shaft pump are made separate for the respective stages, and these parts of the respective stages are coupled to each other by connecting means such as a flange connection, screw coupling or the like.

With the arrangement, disassembling for assembling, maintenance or the like can be facilitated.

Other objects, features and advantages of the invention will become apparent from the following description with reference to the accompanying drawings.

DESCRIPTION OF PREFERRED EMBODIMENTS

Figure 1:
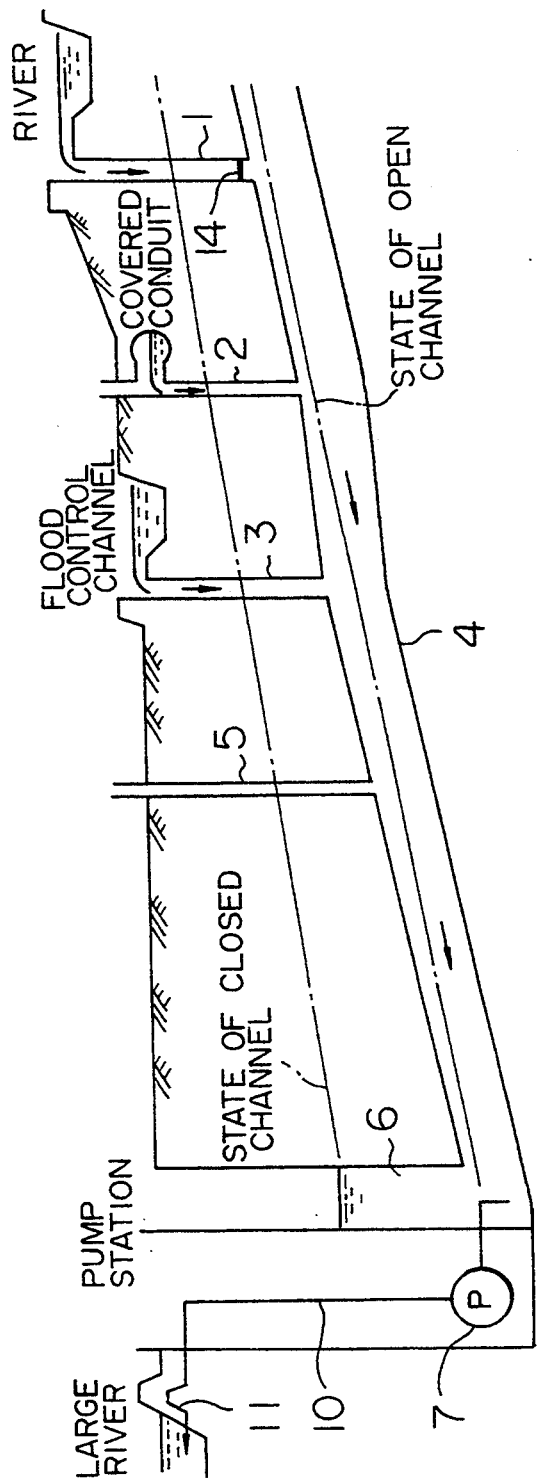
FIG. 1 is a longitudinal cross-sectional view of an underground drainage facility according to an embodiment of the invention.

Referring now to the drawings wherein like reference numerals are used throughout the various views to designate like parts and, more particularly, to FIG. 1, according to this figure, drainage flowing into small rivers on the earth's surface, covered conduits, flood control channels or the like flows into an inflow water channel (a large underground water channel or an underground floodway) 4 through a plurality of vertical inflow shafts 1, 2 and 3 connected thereto. The drainage flowing into the inflow water channel 4 flows down into a pump well 6 at a pump station to be pumped by a pump 7, and is discharged into a large river, which is the place where influent is discharged, through a discharge pipe 10 and an overflow weir 11. Further, an air shaft 5 is suitably provided in the inflow water channel 4.

A characteristic and specification of the pump 7 is determined such that a predetermined estimated quantity of water can be discharged on the condition that incoming water flows down through the inflow water channel 4 in a full state, that is, in closed channel operation.

When water flows from the vertical inflow shafts 1, 2 and 3 to fill the inflow water channel 4 to make the same a closed channel, a water level in the pump well 6 rises, and an actual lift of the pump 7 is reduced and is made less than that when an estimated quantity of water is discharged from a condition of an open channel.

Figure 2A:
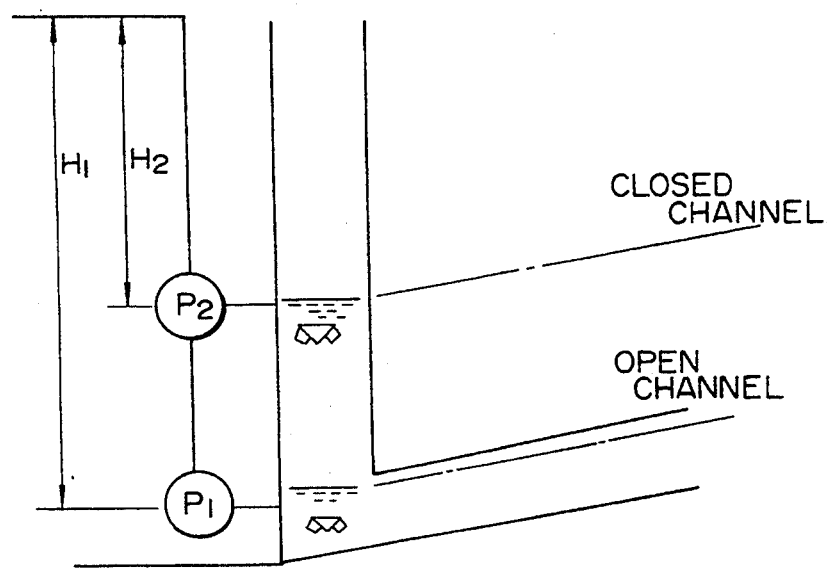
FIG. 2A is a schematic cross-sectional view of a pump well.
Figure 2B:
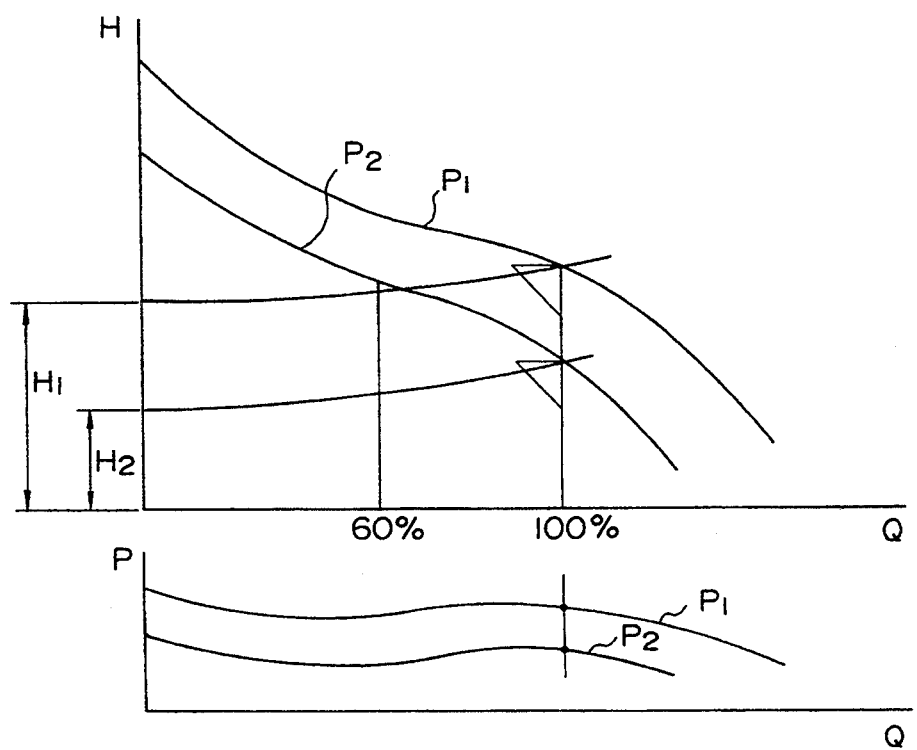
FIG. 2B is a graphical illustration of pump running conditions.

As shown in FIGS. 2A and 2B, since a pump $P_1$ can discharge an estimated quantity of water with water channel opened, $H_1$ is required for an actual head and power also increases. On the contrary, since a pump $P_2$ can discharge an estimated quantity of water with the water channel closed, $H_2$ is sufficient for the actual head, and power also decreases.

Figure 3A:
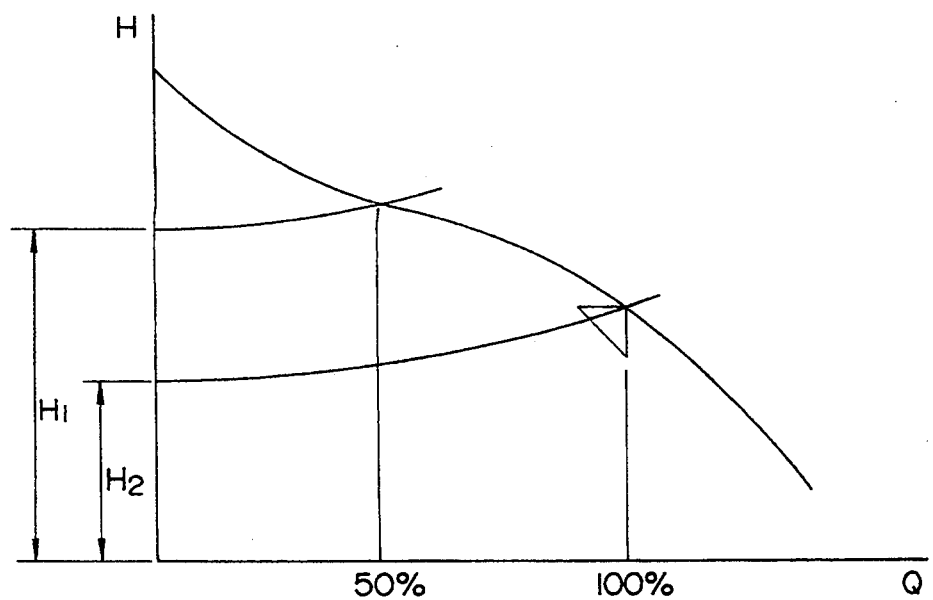
FIG. 3A is a diagrammatic illustration of a pump running condition.
Figure 3B:
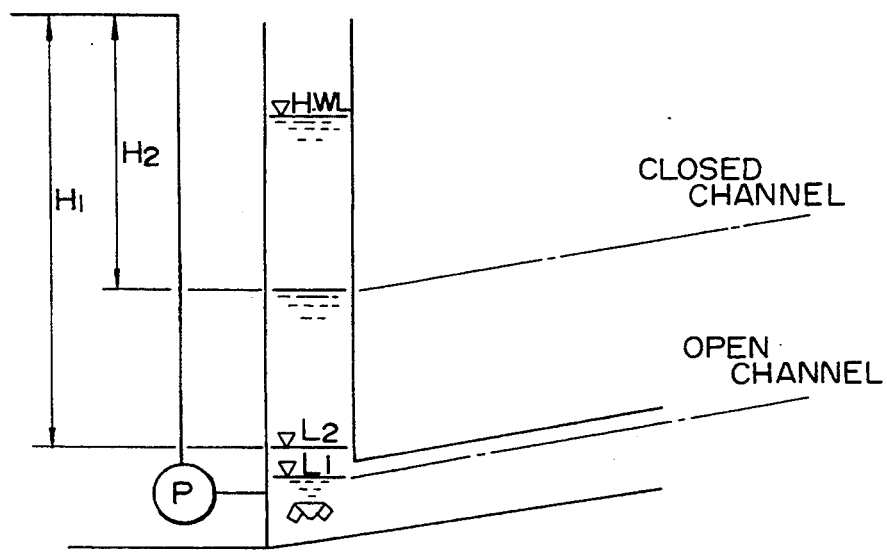
FIG. 3B is a cross-sectional view of a pump well.

A position where the pump 7 is installed is desirably determined such that in terms of a tendency in a characteristic curve Q-H of the pump, no-discharge operation is not effected even at the maximum actual head, as shown in FIGS. 3A and 3B, but a quantity of water more than an estimated quantity of water of 30~50% can flow. If the position where the pump is installed is determined such that the estimated quantity of water flows with the channel closed as described above, considerable reduction in power can be realized.

Subsequently, if the pump 7 illustrated in FIG. 1 includes an adjustable vane pump, further advantages are realized. Since an adjustable vane pump requires less power when a vane angle is at about the minimum value, continuous running is possible even in the no-discharge operation. Accordingly, waiting running is made possible.

Figure 4:
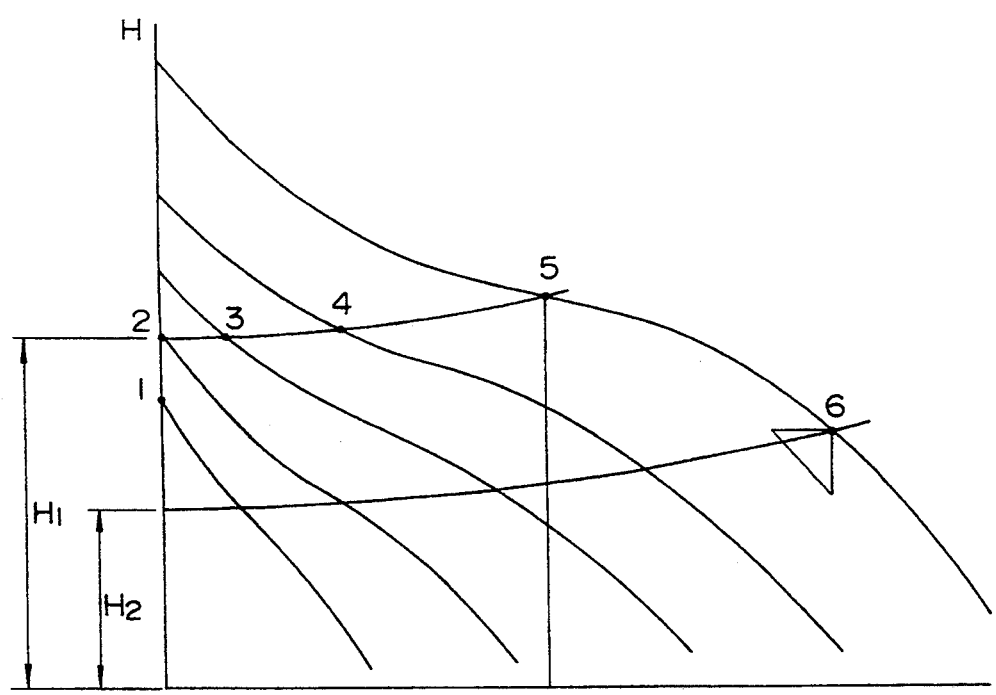
FIG. 4 is a diagram illustration of running conditions of the embodiment according to the invention, which uses adjustable vane pumps.

Now, it is assumed that the pump starts at the minimum vane angle when water level in the inflow water channel 4 is $L_1$ in the opened condition shown in FIGS. 3A and 3B, and the vane angle is gradually opened when the water level rises to reach a level $L_2$. Then, as running point shifts to points 1 to 2 to 3 to 4 to 5 in FIG. 4. As the quantity of inflow further increases, the water level rises, and the actual pressure head is reduced. Accordingly, the running point shifts from point 5 to point 6 and discharge of the estimated quantity of water. Normally, vanes of the movable vane pump can be operated from a fully closed position to a fully opened position within one to three minutes or so. Accordingly, if the pump is run in waiting with the channel opened, a size or dimension of the plump well can be determined such that HWL is not reached until the vane angle is changed to a fully opened position. Thus, the pump well 6 having a small sized serves the purpose. Moreover, since the vane angle is small at initial discharge of water and hence a quantity of discharge is small, it is unnecessary provide a discharge valve in a conventional manner. Only provision of a weir on this side of the place where water is discharged on the discharge side makes it possible provide a system. It is possible to dispense with a discharge valve of a large opening diameter for high pressures.

Further, as a method of starting the adjustable vane pump, it is possible that not only a water level in the pump well, but also a water level in the upstream inflow water channel and the upstream inflow vertical shafts are monitored, and the pump is started when the water level rises. In some large underground drainage facilities, the pump 7 is so different from the inflow vertical shafts that it takes several tens of minutes until water in the neighborhood of the inflow vertical shafts moves after the starting of the pump. As a countermeasure for this, it is possible to prevent flooding due to follow-up delay by starting the pump to begin a discharge of water by a small quantity when water levels within the respective inflow vertical shafts start to rise.

Furthermore, upsurge can occur in an inflow water channel system when a normal fixed-vane water discharge pump and if so, rivers, covered conduits, flood control channels and the like can overflow water due to upsurge at stop of the pump. With an adjustable vane pump, however, upsurge in the inflow water channel system can be considerably reduced by stopping the adjustable vane pump after waiting running with the vane angle nearly closed while the vane angle is gradually closed. The above-described advantage can also be achieved by employing, as the pump 7, a pump in which rotational speed is controlled. That is, the pump suffices to be smarted at a low rotational speed at a water level $L_1$ in the inflow water channel 4 which is in a state of an open channel, and it suffices to increase rotational speed when a water level $L_2$ is reached.

Moreover, also it is possible at a stopping of the running of the pumps to reduce up surge in the inflow water channel system by stopping the pump after waiting running at low speed.

Figure 5:
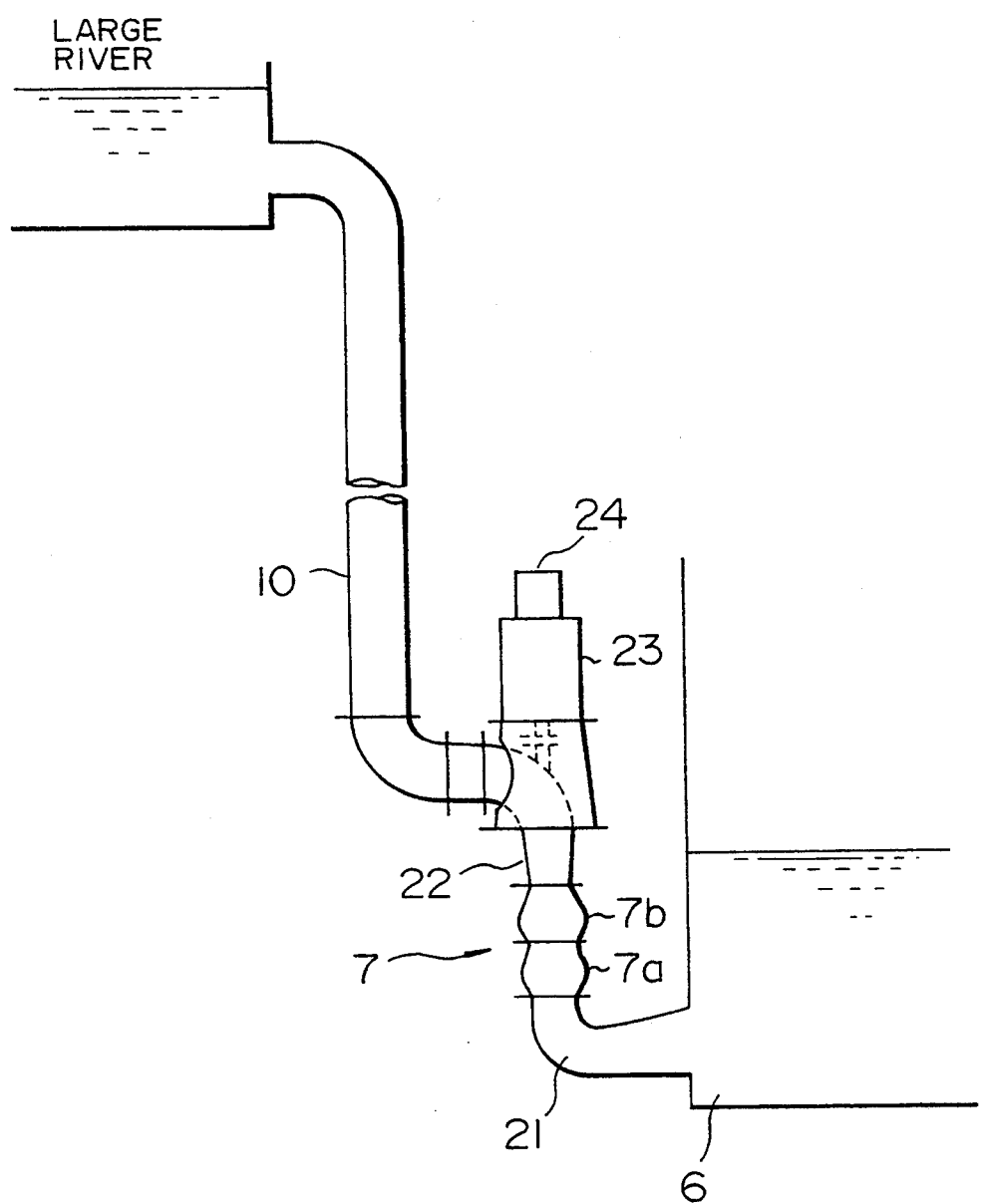
FIG. 5 is an enlarged schematic view of a pumping station, to which a vertical-shaft multi-stage adjustable-vane pump according to the invention is applied.
Figure 6:
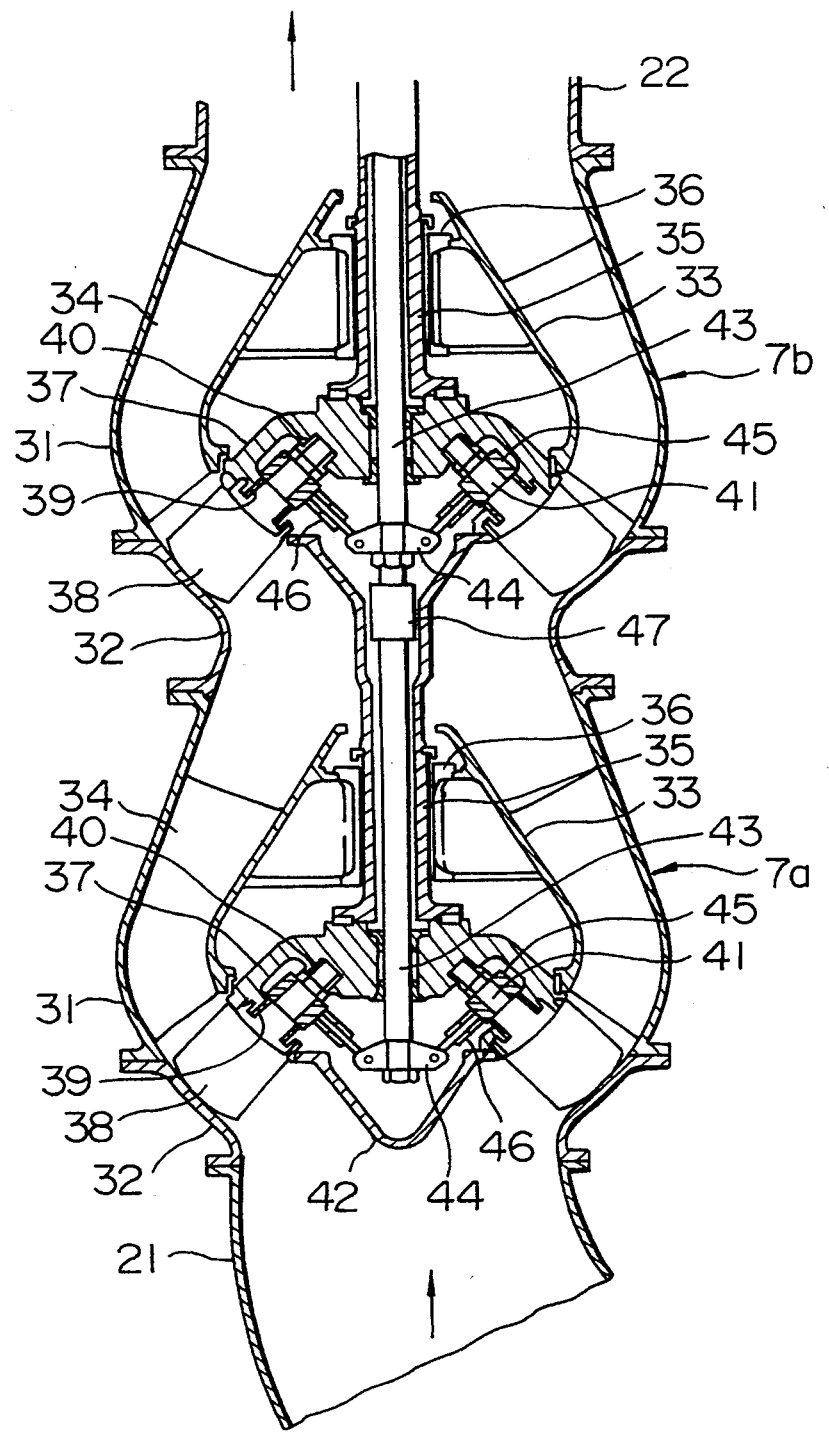
FIG. 6 is a cross-sectional view showing a vertical-shaft multi-stage adjustable-vane pump according to an embodiment of the invention.

As shown in FIGS. 5 and 6, as the pump 7 a vertical-shaft multi-stage adjustable-vane pump is utilized having two vertical-shaft mixed-flow stages, with adjustable vane impellers 7a and 7b being connected to each other in a two stage manner. The lower-stage adjustable-vane impellers 7a have a suction port which is in communication with the pump well 6 through a suction tube 21 in the form of an elbow, and a discharge port which is directly connected to the upper-stage adjustable-vane impellers 7b. The adjustable vane impellers 7b have a discharge port which is connected to a discharge tube 10 through a discharge elbow tube 22, said discharge tube 10 being opened to a large river where discharge is effected. A drive shaft of the pump 7 extends out upwardly from a portion of the discharge elbow tube 22, and is connected to a drive machine 23 through a coupling. As described hereinafter, the drive shaft is hollow, and an operating shaft for adjustment of a vane angle is inserted into the hollow portion of the drive shaft. A vane-angle control unit 234 is connected to an upper end of the operating shaft. Here, an embodiment of a mixed-flow adjustable-vane will be described. However, the embodiment may be one of axial flow type.

As shown in FIG. 6, principal portions of the respective adjustable vane pumps 7a and 7b are identical to each other. An outer shell of the adjustable vane pump 7a is formed into a configuration of rotation symmetry and comprises an outer casing 31 and a casing liner 32 connected to the suction side of the outer casing 31. An inner casing 33 of rotation symmetry is fixed within the outer casing 31 by guide vanes 34 with its axis of rotation symmetry corresponding to that of the outer casing 31. A hollow drive shaft 35 is arranged inside the inner casing 33, and is supported on the inner casing 33 by a bearing 36. An impeller hub 37 is mounted on a lower end of the drive shaft 35 in flanged manner. The impeller hub 37 has its outer peripheral edge mounted slidably on an outer peripheral of the lower end of the inner casing 33 through water seals. A plurality of impellers 38 extending toward an inner surface of a casing linear 32 are mounted on the impeller hub 37. Each of the impellers 38 is mounted on the impeller hub 37 through a stem shaft 41 which is supported by two bearings 39 and 40 such that vane angles can be changed. Moreover, an impeller hub cover 42 having a configuration which forms an extension of the inner casing 33 is mounted on the suction side of the impeller hub 37. An operating shaft 43 is extended through a hollow portion of the drive shaft 35 and a through bore centrally formed in the impeller hub 37. A spider 44 is mounted on a lower end of the operating shaft 43, and is connected to an am 45 mounted on the stem shaft 41, by a turnbuckle 46 through a ball joint. The arm 45, the turnbuckle 46 and the ball joint constitute a link mechanism for converting vertical linear motion of the operating shaft 43 into vane-angle rotational motion of the impeller 38. A conventional mechanism of the type described, for example, in Japanese Patent Unexamined Publication No. 1-187399, may be employed as the link mechanism.

The adjustable vane pump stage 7b having a pair of casings 31 and 32 of the same construction as that in the pump stage 7a is connected to an upper portion of the adjustable vane pump stage 7a formed in this manner. An upper end of the drive shaft 35 of the adjustable vane pump stage 7a is connected to an impeller hub 37 of the adjustable vane pump stage 7b by a flange or the like. Further, the upper end of the operating shaft 43 of the adjustable vane pump stage 7a is connected to the lower end of an operating shaft 43' of the adjustable vane pump stage 7b by a screw coupling 47. More specifically, the upper end of the operating shaft 43 of the adjustable vane pump stage 7a and the lower end of the operating shaft 43' of the adjustable vane pump stage are threaded to provide 7b male threads which are to be screwed into the coupling 47 formed with female threads. Upper ends of a drive shaft 35' and the operating shaft 43' of the upper adjustable vane pump stage 7b are extended straight upwardly from the discharge elbow tube 22 as shown in FIG. 5, and are connected to the drive machine 23 and the vane-angle control unit 24, respectively. The vane-angle control unit 24 is provided with an actuator which advances and retracts the operating shafts 43' and 43 axially. For this actuator, a hydraulic or pneumatic cylinder, an electric motor or the like is used.

When running of the drive machine 23 starts, the upper-stage impeller 38 is rotated through the upper-stage drive shaft 35' and the impeller hub 37. Simultaneously therewith, the lower-stage impeller 38 is rotated through the lower-stage drive shaft 35 connected to the upper-stage impeller hub 37 and the lower-stage impeller hub 38. This, inflow water within the pump well 6 is drawn or suctioned through the suction elbow tube 21 to be discharged into a large river through the discharge tube 10. At this time, since the adjustable vane pump stages 7a and 7b are connected in series to each other, a full or total pressure head of the pump 7 is the sum of total the pressure heads of the respective pumps 7a and 7b. In other words, the total pressure heads of the respective stages 7a and 7b may be smaller than a required head determined by the drainage plan, and may be about ½, for example. Accordingly, since a load applied to the impellers 38 is reduced accordingly, it is possible to reduce a load applied to the vane-angle operating mechanism. As a result, constitutional elements of the vane-angle operating mechanism can be similar in size to the conventional ones, so that it is possible to incorporate the vane-angle operating mechanism into the impeller hubs 37. Since the total pressure head per stage is small, it is possible to maintain specific speed large. Accordingly, it is possible to realize an adjustable vane pump which avoids cavitation, is high pressure in efficiency, and is suitable for use of high head and large capacity, in contrast to an adjustable vane pump of single stage type.

When the operating shafts 43 and 43' are axially displaced by the vane-angle control unit 24, the vane angles of the respective upper-stage and lower-stage impellers 38 can simultaneously be adjusted in opening and closing directions through the spiders 44, the turn buckles 46 and the arms 45. By doing so, it is possible to vary the discharge of the pump 7 within a wide range, and considerable regulation of the pump performance is made possible. Accordingly, the pump is favorably applied to waiting running or to an underground drainage facility in which a quantity of inflow water varies widely.

Furthermore, it is preferable in the vertical-shaft multi-stage adjustable-vane pump illustrated in FIG. 6 to set the axial positional relationship between the operating shafts 43 and 43' and the spiders so that the vane angle of the impeller 38 of the lower-stage adjustable-vane pump 7a is made slightly large (on the degree of 1~2 degrees, for example) than the vane angle of the impeller 38 of the upper-stage adjustable vane pump 7b. By doing so, the following advantages are realized.

Even if the vane-angle opening degree of the upper-stage pump 7b becomes minimum to present a closed condition, the vane-angle opening degree of the lower-stage pump 7a is slightly open. Accordingly, it is possible to secure a suction pressure of the upper-stage pump 7b of a predetermined value or more. Thus, it is possible to positively prevent cavitation of the upper-stage pump 7b from occurring due to reduction in suction pressure.

Since a large vane angle is generally favorable in anti-cavitation performance in large flow rates, the above arrangement is suitable for a case where the pump 7 is used at flow rates greater than a designed point. In this connection, although the upper-stage pump 7b becomes unfavorable in anti-cavitation performance at high flow rates, the suction pressure in the upper stage is got up by the lower stage. Accordingly, in the present embodiment, cavitation does not become a problem.

If the vane angle is changed. flow rates at which stall or counterflow of fluid inherent in flow of small flow rate is generated change. However, a difference provided between the upper-stage and lower-stage vane angles can prevent stall and counterflow from being simultaneously generated both in the upper and lower pumps 7a and 7b, so that it is possible to effect steady running even at small flow rates.

Further, the vertical-shaft multi-stage adjustable-vane pump illustrated in FIG. 6 is constructed such that the casings, the drive shafts, the operating shafts and the like are distinct and are provided for the respective stages, and are connected to each other by couplings such as a flange or the like to make assembling and disassembling of the pump easy. More specifically, in assembling the pump, the upper-stage adjustable-vane pump stage 7b is first assembled except for the casing liner 32. The lower-stage operating shaft 43 is next connected to the upper-stage operating shaft 43' by the screw coupling 47 and, subsequently, the lower-stage drive shaft 35 is joined to the upper-stage impeller hub 37. Next, after the mounting of the upper-stage casing liner 32, the adjustable-vane mixed flow ball section of the lower adjustable-vane pump stage 7a is assembled. In disassembling the pump, the upper-stage adjustable-vane mixed flow portion is disassembled after the adjustable-vane mixed flow ball section, the drive shaft 35 and the operating shaft 43 of the lower adjustable-vane pump stage 7a are dismounted in the reverse order.

Figure 7:
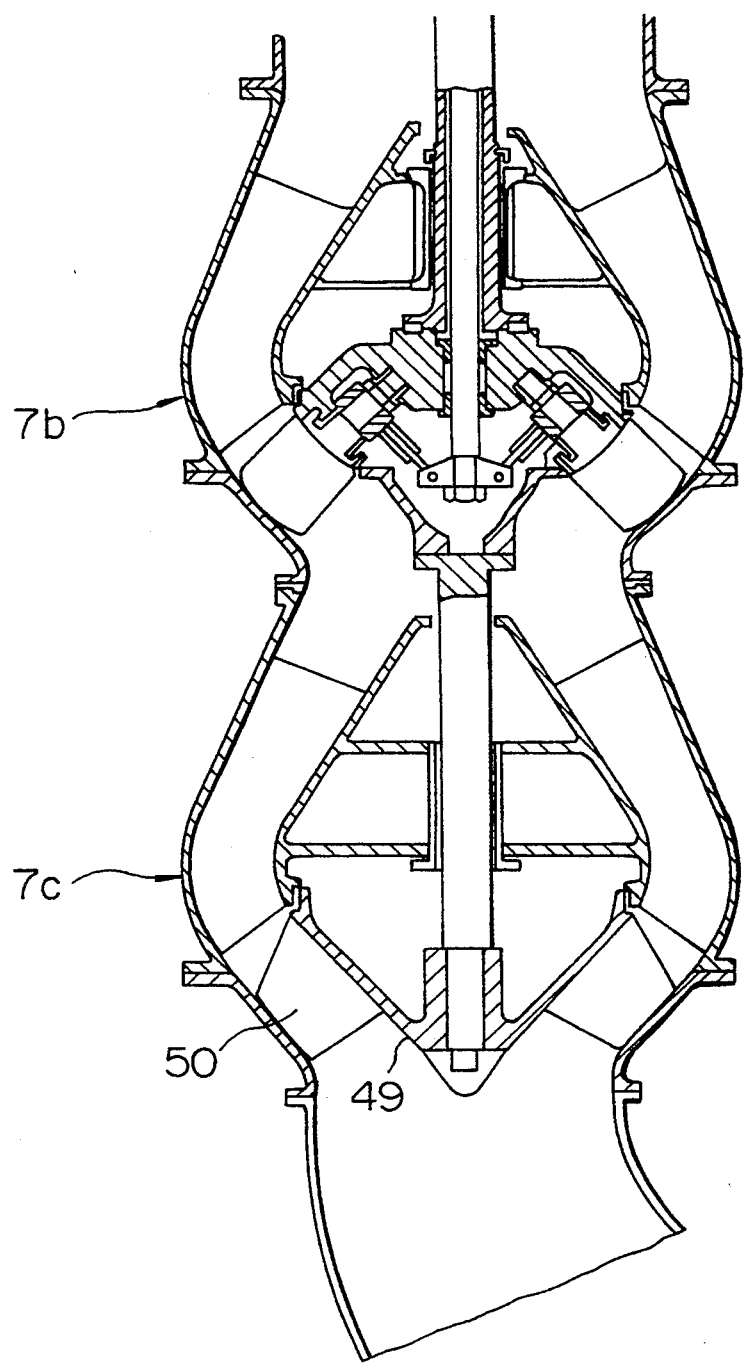
FIG. 7 is a cross-sectional view of a vertical-shaft multi-stage adjustable-vane pump according to another embodiment of the invention.

In the embodiment of FIG. 7, a vertical-shaft pump 7c of a fixed vane type replaces the lower adjustable-vane pump stage of the embodiment illustrated in FIG. 6. The upper adjustable-vane pump stage 7b is of the same construction as that of the embodiment illustrated in FIG. 6. The lower fixed vane pump stage 7c is constructed such that an impeller 50 with the vane angle fixed is mounted on an impeller hub 49 provided rotatably with respect to the inner casing 33.

According to the present embodiment, the adjustable-vane pump stage 7b is connected in series to the fixed vane pump stage 7c and so the total pressure head of the pump 7 amounts to the sum of the total pressure heads of the respective pump stage 7b and 7c. Accordingly, the embodiment of FIG. 7 can be applied to a pump of high total pressure head, as compared with an adjustable vane pump of a single stage. Furthermore, according to the embodiment of FIG. 7, the structure of the pump becomes simple as compared with the embodiment illustrated in FIG. 6, and a force required for adjusting the vane angle can also be reduced. On the other hand, pump performance due to regulation of the vane angle is subjected to a small change. In this connection, the arrangement of the upper and lower stage of the embodiment illustrated in FIG. 7 may be varied such that the upper stage becomes of a fixed vane type. In this case, a problem of cavitation arises in the upper stage when the lower-stage adjustable-vane pump is run in the vicinity of closure.

The embodiments illustrated in FIGS. 6 and 7 are illustrated as being applied to a vertical-shaft mixed flow pump and may be applied to a vertical-shaft axial flow pump. Moreover, also the number of stages of adjustable vane pumps connected in series to each other is not limited to two stages and is appropriately selected in accordance with the estimated head.

Figure 8:
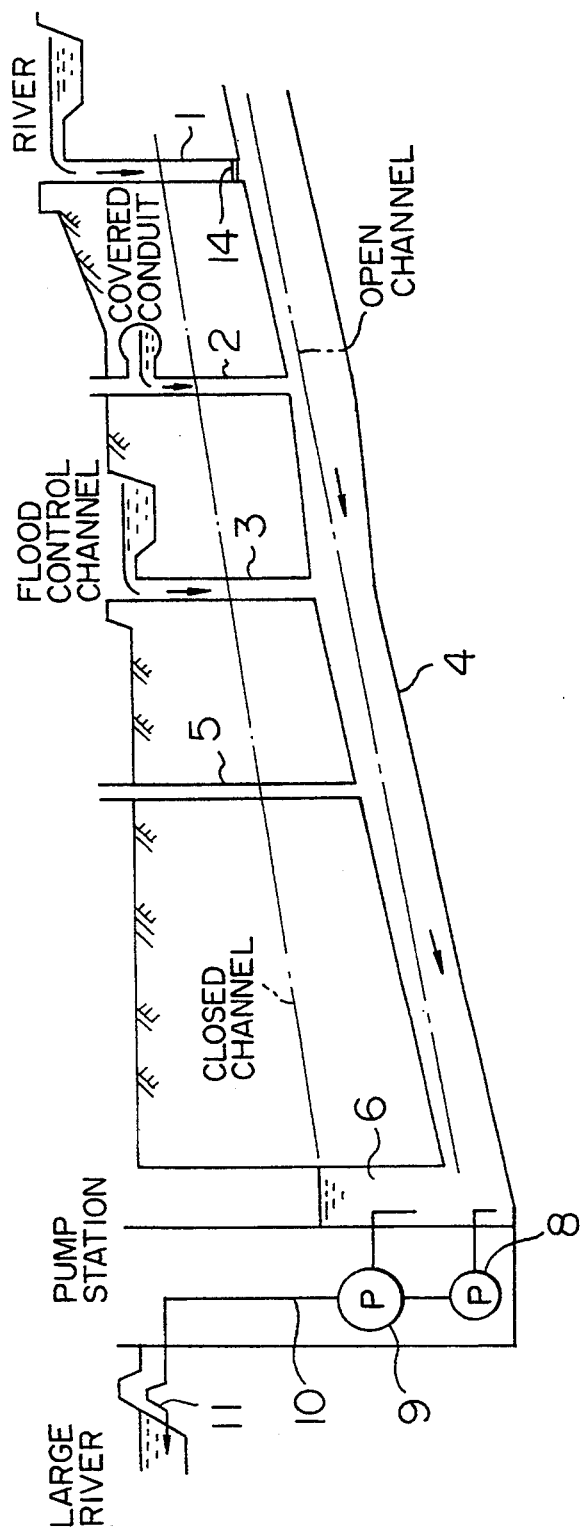
FIG. 8 is a longitudinal schematic view of an underground drainage facility according to another embodiment of the invention.
Figure 9:
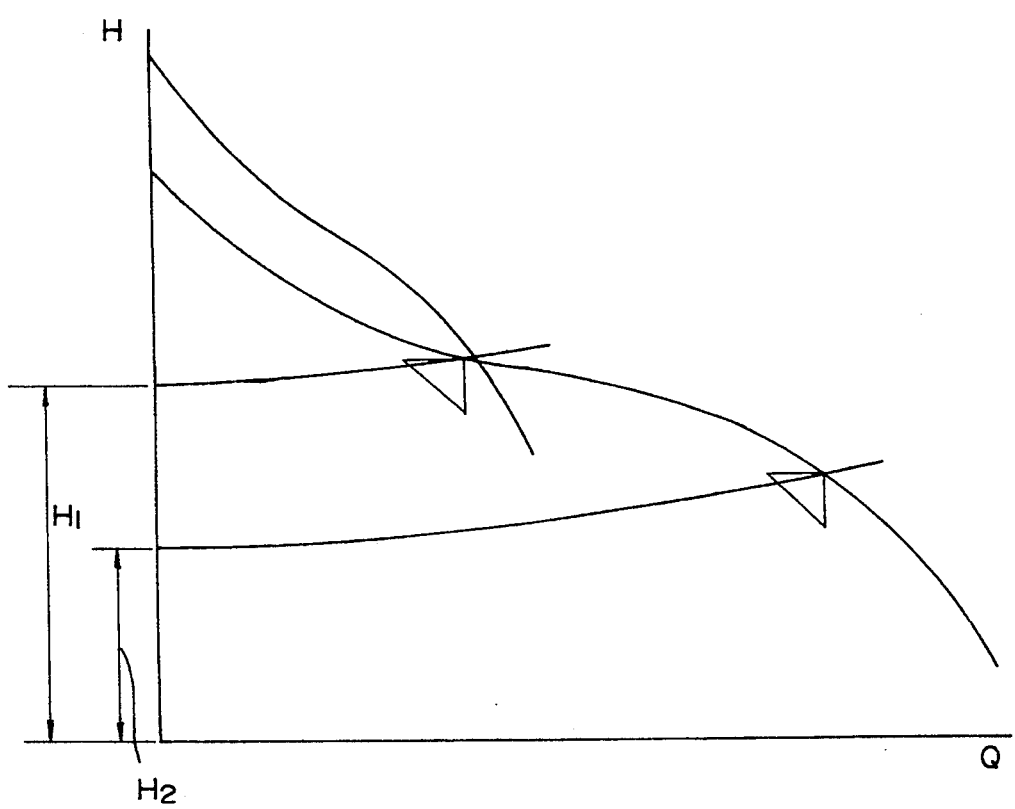
FIG. 9 is a diagrammatic illustration of a running condition of the embodiment according to the invention, in which a small-capacity and high pressure head pump and a large-capacity and low pressure head pump are combined with each other.

FIG. 8 shows an embodiment in which the pump 7 of the embodiment illustrated in FIG. 1 includes a small-capacity and high pressure head pump 8 and a large-capacity and low pressure head pump 9 in place of the above-described adjustable vane pumps. To obtain similar effects, running in the embodiment comprising the adjustable vane pumps in the vicinity of the full closure of the vane angles is run by the small-capacity and high pressure head pump, while running in the vicinity of the full opening of the vane angles is run by the large-capacity and low pressure head pump. Running characteristic of the pumps are shown in FIG. 9. Here, two kinds of pumps are shown. Of course, it is needless to say that several kinds of pumps may be installed for several stages.

Effects of the above embodiments on upsurge at stoppage of the pumps and time lag caused during a period of time elapsed from the running of the pump until water in the inflow water channel starts to be moved will be described hereinbelow.

Drainage from a river overflows a weir to flow into an inflow vertical shaft 1. At this time, a height of the weir is set such that the maximum water level of the river is not reached even if a quantity of water due to upsurge at stoppage of the pumps or a quantity of inflow compensating for a period of time elapsed until water in the inflow water channel immediately below the overflow weir after pump running starts to flow enters the river. In this manner, there is removed a risk off floodwater and the like even though there is follow-up delay of water due to upsurge at the time of stoppage of the pumps and the inflow water channel being long. Moreover, a small buffer of the entire underground drainage facility serves the purpose.

Figure 10:
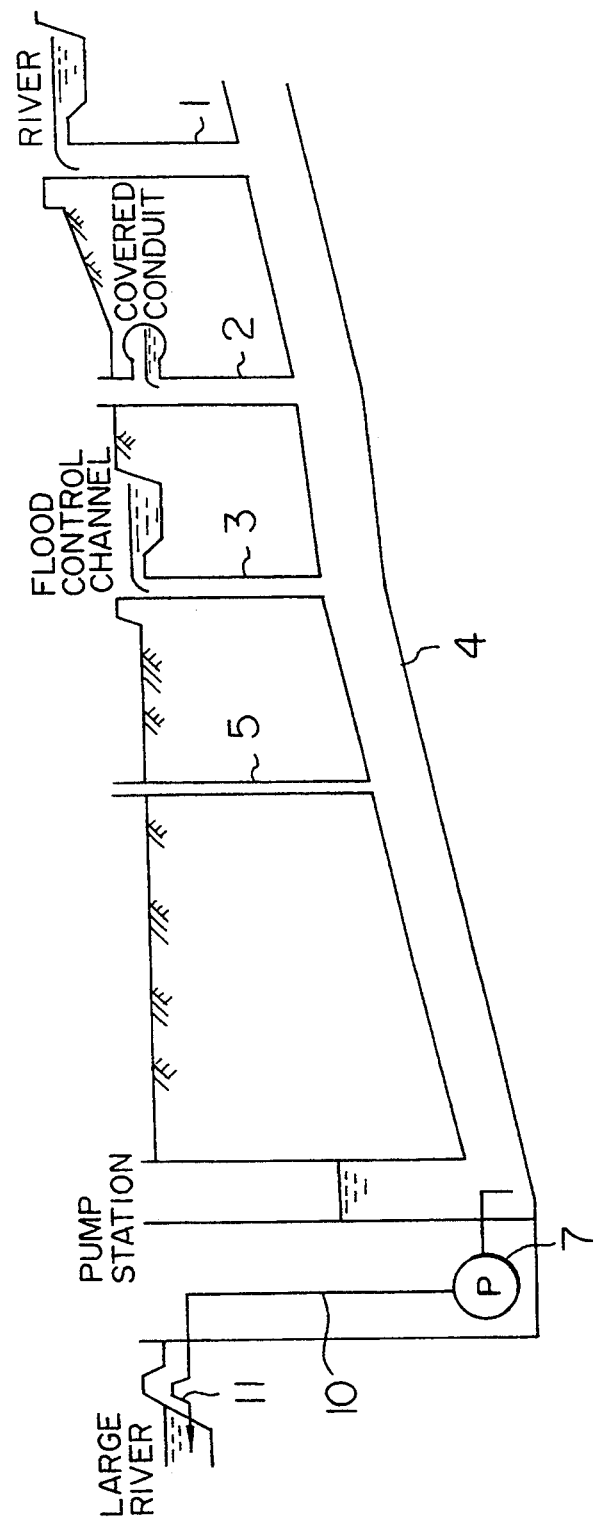
FIG. 10 is a longitudinal schematic view of an underground drainage facility according to another embodiment of the invention.

FIG. 10 shows another embodiment for preventing floodwater due to the follow-up delay of water in the inflow water channel from occurring. In the embodiment of FIG. 10, there is provided a buffer effect by relatively enlarging inflow vertical shafts relative to quantities of inflow as it goes further upstream in the light of the fact that the further it goes upstream the worse the follow-up of water in association with the pump 7.

As described above, the embodiments of the underground drainage facility according to the invention can produce the following advantages:

Since the pump is installed at a location where an estimated quantity of water can be discharged in a closed channel, it is possible to reduce a required power.

Since the pump waits for drainage, a small buffer of the underground drainage facility such as a pump well or the like serves the purpose.

Since drainage of a small quantity of water is possible at starting of the pump, a discharge valve can be dispensed with.

Since the follow-up delay of the inflow water channel at starting of the pump and upsurge at stop of the pump can be reduced, a problem such as floodwater or the like is eliminated.

Since inflow enters into the vertical shaft in an overflow manner, rivers, covered conduits and flood control channels can be utilized as buffer, and it is possible to solve floodwater problems and reduce the buffer of the underground drainage facility.

The further it goes upstream the greater a buffer effect becomes relatively, so, there is eliminated problems such as floodwater and the like.

Figure 11:
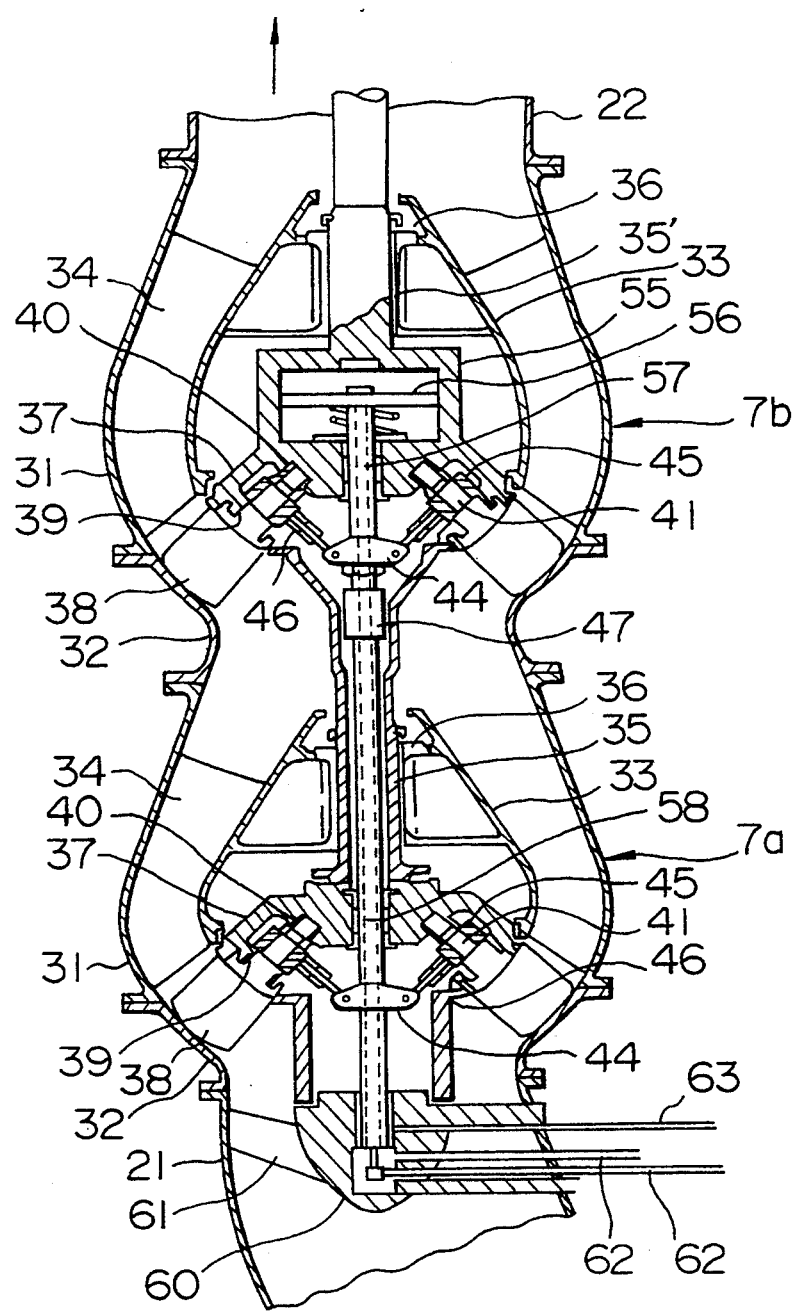
FIG. 11 is a longitudinal cross-sectional view of an embodiment of the invention in which an actuator of a vane-angle control unit in the vertical-shaft multi-stage adjustable-vane pump shown in FIG. 6 is received in an inner casing of an upper-stage adjustable-vane pump.

FIG. 11 shows an embodiment in which the actuator of the vane-angle control unit in the vertical-shaft multistage adjustable-vane pump illustrated in FIG. 6 is received in an inner casing 33 of an upper-stage adjustable-vane pump 7b. As shown in FIG. 11, a hydraulic cylinder 55 is provided on an upper portion of an impeller hub 37 of the upper-stage adjustable-vane pump 7b to be connected to a drive shaft 35'. Operating shafts 57 and 58 are attached to a piston 56 of the hydraulic cylinder 55, and mount thereon spiders 44 fixedly. The operating shaft 58 has a lower end thereof rotatably supported by an impeller hub cover 60 which in turn is supported on a suction tube 21 by a support piece 61. A hydraulic or oil passage in communication with a hydraulic chamber in the cylinder 55 is formed through the operating shafts 57 and 58. The hydraulic passage is in communication with a hydraulic source through hoses 62 which are extended to the outside out of the impeller cover 60. Further, boss oil or boss hydraulic fluid is supplied to a bearing section for the operating shaft 58 of the impeller hub cover 60 through a hose 63. With the arrangement, hydraulic oil is supplied to and discharged from the hydraulic chamber of the hydraulic cylinder 55 through the hoses 62, to drivingly displace the operating shaft in an axial direction to thereby control the vane angles. According to the present embodiment, it is possible to compact the vane-angle control mechanism. In this connection, the vane-angle control mechanism according to the embodiment of FIG. 11 may, for example, be a mechanism of the type described in, for example, Japanese Patent Unexamined Publication No. 58-35294.

In the underground drainage facility of the present invention, it is possible to save power for driving the drainage pump, and the size of pump station can be reduced, so that cost for the building or construction and running cost can be reduced.

Moreover, there can be provided a highly reliable underground drainage facility which will not cause rivers on the upstream side and the like to overflow in spite of the follow-up delay of the inflow water on the upstream side and upsurge at stoppage of the pump.

Furthermore, with the construction of the vertical-shaft multi-stage adjustable-vane pump of the present invention, it is possible to restrain the total pressure head per stage of the adjustable vane pump so that the vertical-shaft multi-stage adjustable-vane pump can be applied to the use of high pressure head and large capacity. As a result, there can be provided a pump suitable for an underground drainage facility which involve running and fluctuation in the quantity of inflow.

What is claimed is:

1. An underground drainage system including a large capacity floodway and small inclination provided at a substantial depth below a surface of the ground into which floodway drainage flows from various drainage water channels on the ground surface and in a vicinity of ground surface through vertical shafts, and from which floodway the drainage is drained from a pump station provided at a part of said floodway, into rivers, a sea or the like, and a pump in the pump station disposed at a location of a larger depth from the ground surface than a rated pressure head of the pump so that an estimated quantity of water can be drained with the floodway in a state of a closed channel.

2. An underground drainage facility according to claim 1, wherein said pump is constructed such that drainage can be effected with said pump at a small capacity short of on-discharge operation when said floodway is in a state of an open channel.

3. An underground drainage facility comprising an underground large water channel provided for causing inflow water to flow down, inflow vertical shafts for introducing water from rivers, covered conduits, flood control channels and the like to said underground water channel, ventilation holes provided in said underground water channel, a pump well arranged on the downstream end of said channel, a pump well arranged on the downstream end of said underground large water channel, and a pump provided in said pump well, wherein said pump is adapted to drain an estimated quantity of water with an inflow water channel in a state of a closed channel, and wherein said pump will not run in no-discharge operation with the inflow water channel in a state of an open channel.

4. An underground drainage facility according to claim 3, wherein said pump provided in said pump well is an adjustable vane pump, and wherein said pump runs under drainage waiting with a vane angle in the vicinity of the minimum and a quantity of drainage is adjusted by regulating the vane angle of said pump in accordance with a rise in water level in said pump well or rising speed of the water level.

5. An underground drainage facility according to claim 3, wherein said pump provided in said pump well is a vertical-shaft multi-stage adjustable-vane pump comprising a plurality of vertical-shaft pump stages connected to each other on the same axis, at least one stage of said vertical-shaft multi-stage pump having an adjustable vane impeller supported such that a vane angle is variable with respect to a drive shaft of said vertical-shaft multiple-state pump and a vane angle operating mechanism for rotating said adjustable vane impeller about a support shaft to operate the vane angle.

6. An underground drainage comprising, an underground large water channel provided for causing inflow water to flow down, inflow vertical shafts for introducing water from rivers, covered conduits, flood control channels to said underground water channel, ventilation holes provided in said underground water channel, a pump well arranged on the downstream end of said channel, a pump well arranged on the downstream end of said underground large water channel, and a pump provided in said pump well, wherein said pump is adapted to drain an estimated quantity of water with an inflow water channel in a state of a closed channel, in a state of a closed channel, said pump does not run in a no-discharge operation with the inflow water channel in a state of an open channel, said pump provided in said pump well is a vertical-shaft multi-stage adjustable-vane pump comprising a plurality of vertical-shaft pump stages connected to each other on the same axis, at least one stage of said vertical-shaft multi-stage pump has an adjustable vane impeller supported such that a vane angle is variable with respect to a drive shaft of said vertical-shaft multi-stage pump and a vane angle operating mechanism is provided for rotating said adjustable vane impeller about a support shaft to operate the vane angle, all of said stages of said vertical-shaft multi-stage pump are adjustable vane pumps, and a drive shaft of each of said adjustable vane pump stages is hollow, said vane-angle operating mechanism includes an operating shaft extending through a hollow portion of said drive shaft, and a link mechanism is connected to said operating shaft and said adjustable-vane impeller converts an axial motion of said operating shaft into a vane-angle rotational motion of said adjustable-vane impeller, and wherein the drive shaft and the operating shaft of each of said stages are connected to each other.

7. An underground drainage facility comprising, an underground large water channel provided for causing inflow water to flow down, inflow vertical shafts for introducing water from rivers, covered conduits, flood control channels to said underground water channel, ventilation holes provided in said underground water channel, and a pump well arranged on the downstream end of said channel, a pump well arranged on the downstream end of said underground large water channel, and a pump provided in said pump well, wherein said pump is adapted to drain an estimated quantity of water with an inflow water channel in a state of a closed channel said pump will not run in a no-discharge operation with the inflow water channel in a state of an open channel, said pump provided in said pump well is a vertical-shaft multi-stage adjustable-vane pump comprising a plurality of vertical-shaft pump stages connected to each other on the same axis, at least one stage of said vertical-shaft multi-stage pump has an adjustable vane impeller supported such that a vane angle is variable with respect to a drive shaft of said vertical-shaft multi-stage pump and a vane angle operating mechanism is provided for rotating said adjustable vane impeller about a support shaft to operate the vane angle, at least an upper stage of said vertical-stage multi-stage pump is an adjustable vane pump, of which a drive shaft is hollow and said vane-angle operating mechanism includes an operating shaft extending through a hollow portion of said drive shaft and a link mechanism connected to said operating shaft and said adjustable-vane impeller converts an axial motion of said operating shaft into a vane-angle rotational motion of said adjustable-vane impeller, and wherein drive shafts of the respective stages of said vertical-shaft pump are connected to each other, and the operating shafts of the adjustable vane pump stages on the side of the upper stage are connected to each other.

8. An underground drainage facility according to claim 5, wherein, when said adjustable vane pump is provided in at least two stages, said vane-angle operating mechanism is set such that the vane angle on a side of the lower stage is slightly greater than the minimum vane angle when the vane angle on the side of the upper stage is at a minimum.

9. An underground drainage facility according to claim 5, wherein said pump runs under drainage waiting at a substantially minimum vane angle, and a quantity of drainage is adjusted by regulating the vane angle of the pump in accordance with at least one of a rise in water level within the pump well or rising speed of the water level.

10. An underground drainage facility according to claim 3, wherein the pump provided in said pump well is a rotational speed control pump, and is run in drainage waiting at a low rotational speed, and wherein the rotational speed of said pump is regulated in accordance with one of a rise in water level in said pump well or rising speed of water level, to regulate the volume of drainage.

11. An underground drainage facility comprising an underground inflow water channel provided for causing inflow water to flow down, inflow vertical shafts for introducing water from rivers, covered conduits, flood control channels to said underground inflow water channel, ventilation holes provided in said underground inflow water channel, a pump well arranged at a downstream end of said underground inflow water channel, a small capacity and high lift pump provided in said pump well which is capable of draining an estimated quantity of water within underground inflow water channel in a stage of an open channel and runs in a drainage waiting period, and a large capacity low lift pump in said pump well which is capable of draining an estimated quantity of water within said underground inflow water channel in a closed channel state.

12. An underground drainage facility according to claim 1, wherein the facility is operated without a valve on a discharge side of said pump, but with one of at least one overflow weir or a siphon on the discharge side of said pump.

13. An underground drainage facility according to claim 1, wherein a drainage waiting running of said pump is effected upon detection of a rise in a water level in the water channels on the upstream side and the vertical shafts.

14. An underground drainage facility according to claim 1, wherein a drainage waiting running is effected for a predetermined period of time before said pump is stopped.

15. An underground drainage facility according to claim 12, wherein a level of said at least one overflow weir, covered conduits and flood control channels are less than an amount corresponding to a quantity of water, which compensates for an upsurge at upon a stopping of said pump, than a maximum water level of the rivers, covered conduits and flood control channels.

16. An underground drainage facility according to claim 12, wherein levels of said at least one overflow weir, covered conduits and flood control channels are determined to be lower by extents corresponding to a quantity of water which flows into the respective rivers, covered conduits and flood control channels within a period of time elapsing until water in the inflow water channel immediately below the at least one overflow weir starts to move after said pump runs, than the maximum water levels of the rivers, covered conduits, and flood control channels.

17. An underground drainage facility comprising an underground inflow water channel for causing inflow water to flow down, inflow vertical shafts for introducing water from rivers, covered conduits, flood control channels to said underground inflow water channel, ventilation holes provided in said underground inflow water channels a pump well arranged at a downstream end of said underground inflow water channel, a pump provided in said pump well, wherein the further upstream of said pump of said inflow water channel, the greater the inflow vertical shafts are with respect to a quantity of inflowing water.

18. A method of operating a drainage pump in a high-depth underground drainage facility including a large capacity floodway arranged at a small inclination provided at a great depth below a ground surface level into which floodway drainage flows from various drainage water channels on the ground surface and in a vicinity of the ground surface through vertical shafts, and from which floodway the drainage is drained from a pump station provided at a part of said underground floodway, into rivers, a sea or the like, wherein drainage is effected by a drainage pump when said underground floodway is in a state of a closed channel.

19. A method according to claim 18, wherein, when said floodway is in a state of an open channel, water drainage is effected by running said drainage pump with its capacity being in a know-discharge operation.

* * * * *